United States Patent [19]

Ichiyasu et al.

[11] Patent Number: 4,908,745
[45] Date of Patent: Mar. 13, 1990

[54] SEQUENCE CONTROLLER

[75] Inventors: Yoji Ichiyasu, Narasino; Katuhiro Fujiwara, Sakura; Oshiga Takayasu; Toshiro Kasahara, both of Narasino, all of Japan

[73] Assignee: Hitachi, Ltd., Tokyo, Japan

[21] Appl. No.: 236,524

[22] PCT Filed: Oct. 7, 1987

[86] PCT No.: PCT/JP87/00757
§ 371 Date: Aug. 5, 1988
§ 102(e) Date: Aug. 5, 1988

[87] PCT Pub. No.: WO88/02883
PCT Pub. Date: Apr. 21, 1988

[30] Foreign Application Priority Data

Oct. 8, 1986 [JP] Japan .................. 61-238076

[51] Int. Cl.⁴ .................. G06F 15/46; G06F 9/00
[52] U.S. Cl. .................. 364/140; 364/900; 364/926.9; 364/941.1
[58] Field of Search .................. 364/140-147, 364/200, 900

[56] References Cited

U.S. PATENT DOCUMENTS

| | | | |
|---|---|---|---|
| 4,564,898 | 1/1986 | Yano | 364/140 |
| 4,567,556 | 1/1986 | Onogi et al. | 364/140 |
| 4,608,661 | 8/1986 | Sasaki | 364/140 X |
| 4,683,549 | 7/1987 | Takaki | 364/141 X |

Primary Examiner—Joseph Ruggiero
Attorney, Agent, or Firm—Fay, Sharpe, Beall, Fagan, Minnich & McKee

[57] ABSTRACT

In cyclically executing the sequence, a signal that informs the controller of the occurrence of a interrupt factor is input to an external signal input terminal. When there are many interrupt factors, it is necessary to quickly analyze the interrupt factors. In this invention, the external signal input terminal is divided into a plurality of blocks, and at least one block is further divided into a plurality of groups. When there develops even one interrupt factor, the data thereof is readily transmitted to a basic unit, and the block in which the interrupt factor has developed raises a flag to inform the controller of this fact. Upon receipt of the above data, the basic unit successively looks for the flags in the blocks. When a flag is detected, the basic unit then successively examines a group that has issued a signal that informs the controller of the occurrence of the interrupt factor in the block in which the flag was found.

6 Claims, 8 Drawing Sheets

FIG. 3

| SEQUENCE OF OPENING THE INTERRUPT STATUS REGISTER GATES. | Sia GATE OF Ia1 IS OPENED. |
| --- | --- |
| | Sia GATE OF Ia2 IS OPENED. |
| | Sib GATE OF Ib1 IS OPENED. |
| | Sib GATE OF Ib2 IS OPENED. |
| | Sib GATE OF Ib3 IS OPENED. |

| SEQUENCE OF OPENING THE DATA STATUS REGISTER GATES. | Sda GATE OF Ia1 IS OPENED. |
| --- | --- |
| | Sda GATE OF Ia2 IS OPENED. |
| | Sdb GATE OF Ib1 IS OPENED. |
| | Sdb GATE OF Ib2 IS OPENED. |
| | Sdb GATE OF Ib3 IS OPENED. |

SEQUENCE CONTROLLER

TECHNICAL FIELD

The present invention relates to a sequence controller which performs a sequential control cyclically and which, when an interrupt occurs, can perform an interrupt processing.

BACKGROUND ART

There are two types of programmable sequencer: a process incrementing type in which logic operation is carried out according to the sequence program each time an external signal is entered; and a cyclic type in which logic operation is executed according to the sequence program in synchronism with a timing signal irrespective of the arrival of an input signal. The process incrementing type is used in applications where the number of input and output points is relatively small and therefore such functions as interrupt processings are not required. In the cyclic type the time required for execution of one cycle of the sequence program depends on the length of the sequence program. In recent years, sequence programs exceeding 100 milliseconds are available. With such long sequence programs, each step of the sequence program can only be executed once for every 100 milliseconds. When a signal indicating the occurrence of abnormal condition is entered, however, there may be cases where a processing required by the emergency situation cannot be delayed until the next scanning. To deal with such a situation an interrupt processing function is needed.

As the number of input and output points increases, the number of input signals that require an interrupt processing may reach as many as several tens of signal points. In such cases, however, if identifying the signal source that produced an interrupt takes too much time, the merit of using the interrupt request signal may be offset resulting in a delayed response.

Among the sequence controllers with an interrupt processing function, the Japanese Utility Model Laid-Open No. 198645/1982 and the Japanese Patent Laid-Open No. 145329/1987 may be cited.

DISCLOSURE OF THE INVENTION

This invention has been accomplished with a view to overcoming the above problem and its main object is to provide a sequence controller that can analyze a source of an interrupt request signal in a short period of time.

Another object of this invention is to provide a sequence controller that can specify relatively freely input terminals to which an interrupt request signal can be entered.

The programmable sequence controller of the invention consists of: a program storage means for storing a sequence program; external signal input terminals divided into multiple blocks, at least one of the blocks being subdivided into multiple groups each of which consists of multiple terminals; an arithmetic and logic operation means having a timing signal generating circuit for producing a timing signal, the arithmetic and logic operation means being adapted to perform logic operation on two or more signals including the external signals taken in from the external signal input terminals, according to the sequence program which was read out from the program storage means in synchronism with the timing signal; and an output means for outputting a control signal according to the result of calculation performed by the arithmetic and logic operation means.

The sequence controller with the above configuration is characterized in further consisting of: first signal generating means for outputting a first signal when an interrupt signal occurs in a group of external signal input terminals; second signal generating means for outputting a second signal when one of the blocks outputs the first signal; a second signal transfer means for informing the arithmetic and logic operation means that the second signal has been produced in the block; and an access means by which the arithmetic and logic operation means when informed by the second signal transfer means of the occurrence of the second signal stops the execution of the logic operation requested by the sequence program, accesses the second signal generating means successively and, when it finds the block that produced the second signal, accesses successively the first signal generating means belonging to that block to identify the group which produced the first signal.

The timing signal generating circuit is formed by a program counter which outputs a memory address signal in synchronism with the timing signal produced by the timing signal generating circuit. The arithmetic and logic operation means is made to perform logic operation on two or more signals including the external signals taken in from the external signal input terminals, according to the sequence program which was read out from the program storage means according to the memory address signal.

The first signal generating means are made to output the first signal when a signal enters a particular terminal of the external signal input terminals.

For that purpose, a specifying means may be provided to specify particular terminals of the external signal input terminals as an interrupt signal input terminal. The specifying means is capable of either specifying the entire external signal input terminals of a particular group as the interrupt signal input terminal or any particular terminals in the group as the interrupt signal input terminal.

In addition to the signals that enter the external signal input terminals, those that occur within the group can also be handled as the interrupt signal.

BRIEF DESCRIPTION OF THE DRAWINGS

FIG. 3 is a diagram showing the sequence of opening the gates of the interrupt status register and the data status register;

BEST MODE FOR CARRYING OUT THE INVENTION

Figure 1:
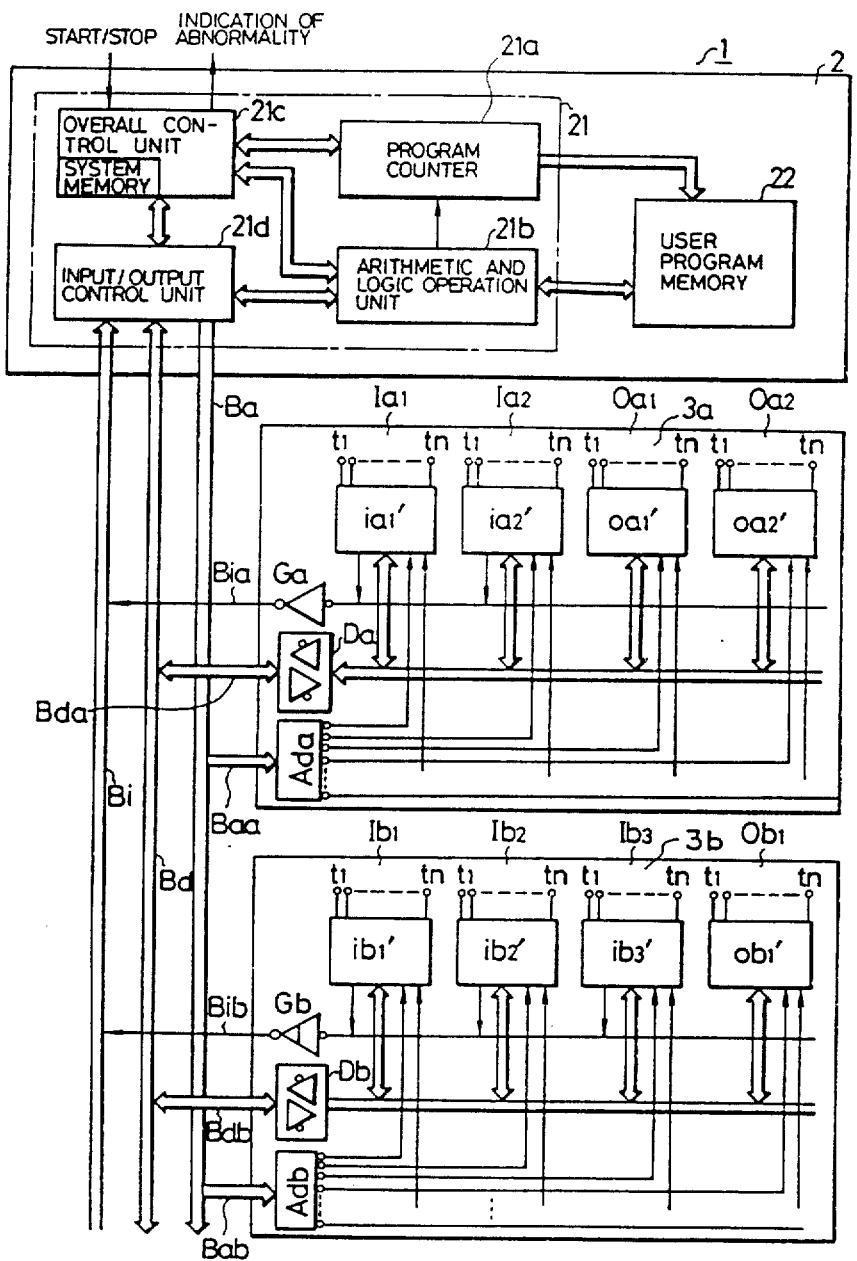
FIG. 1 is a block diagram of the sequence controller, an embodiment of this invention.

The sequence controller generally designated by reference numeral 1 consists of a basic unit 2 and multiple (in the drawing, two) input/output interface blocks 3a, 3b. The input/output interface blocks 3a, 3b are also called an extension unit as opposed to the basic unit 2 and a number of the extension units, within a certain limit, accommodating the input/output points can be connected to the basic unit 2.

The basic unit 2 consists of a central processing unit 21 as a computing means and a program memory 22 as a program storage means. The central processing unit 21 is further made up of a program counter 21a, an arithmetic and logic operation unit 21b, an overall control unit 21c, and an input/output control unit 21d. The program memory 22 has a user's sequence program stored therein. The program counter 21a generates a timing signal at predetermined intervals and outputs a memory address signal in synchronism with the timing signal. The arithmetic and logic operation unit 21b performs logic operation on two or more signals including external information taken in from the blocks 3a, 3b according to an instruction which is contained in the sequence program in the program memory 22 at an address specified by the memory address signal from the program counter 21a. The result of the logic operation is supplied to the output terminals of output modules 011, 012 in the blocks 3a, 3b. The input/output control unit 21d controls the transfer of signals between the blocks 3a, 3b and the central processing unit 21 according to the instructions contained in the sequence program. The overall control unit 21c incorporates a system memory for controlling the entire operation of the central processing unit 21. To describe in more concrete terms, the control involves taking in the start/stop signals for the entire sequence controller 1, initializing the program counter 21a, and demanding the starting and stopping of the arithmetic and logic operation unit 21b. Also, the unit 21c accepts an input/output interrupt request, which is an emergency processing request, from the blocks 31, 3b, analyzes the source of the interrupt request, and demands the execution of the interrupt request such as changing of the calculation operation.

The block 3a consists of input modules Ia1, Ia2 and output modules Oa1, Oa2; and the block 3b consists of input modules Ib1, Ib2, Ib3 and an output module Ob1. The input modules Ia1, Ia2, Ib1, Ib2, Ib3 each have external signal input terminals t1 through tn. The input modules Ia1 through Ib3 have the function of converting the voltage level of the signal entered to a terminal into a specified corresponding value and latching the signal until it is accessed at the terminal, so that the sequence controller can recognize that the signal has entered into the terminal. Each of the output modules Oa1 through Ob1 also has signal output terminals t1 through tn. The output modules Oa1 through Ob1 have the function of converting the signal to be output from these terminals into an appropriate form of voltage (direct current or alternating current) with a proper voltage level and latching the output signal of the terminal until it is accessed. Circuits with latching and signal conversion functions are designated by ia1', ia2', ..., ib3', oa1', ..., ob1'. As shown, the signal input terminals are grouped into a plurality of large blocks as indicated by 3a, 3b and at least one of these blocks (in this embodiment, both blocks) is further divided into a plurality of smaller groups Ia1 to Ib3. And each of these groups consists of a plurality of input terminals.

The input/output control unit 21d and the blocks 3a, 3b are interconnected through address buses Ba, Baa, Bab, data buses Bd, Bda, Bdb and interrupt signal lines Bi, Bia, Bib.

When only the interrupt signal is to be transferred, the interrupt signal lines Bi, Bia, Bib need only carry 1-bit information.

In the data buses Bda, Bdb are provided bidirectional bus drivers Da, Db which open their gates according to the gate signal from the central processing unit 21. Address decoders Ada, Adb are provided in address buses Baa, Bab. The outputs of the address decoders Ada, Adb are fed to data output switching units Ca1, Ca2, Cb1, Cb2, which send signals to the interrupt status registers Sil, Sib and to the data status registers Sda, Sdb.

The central processing unit 21, when it receives information through the interrupt signal line Bi calling for an interrupt processing, controls the data output switching units Ca1, Ca2, Cb1, Cb2 in the order shown in FIG. 3. At first, the gate of the interrupt status register Sia of the input module Ia1 is opened. Next, this gate is closed and the gate of the interrupt status register Sia of the input module Ia2 is opened. Then, this gate is also closed and the gate of the interrupt status register Sib of the input module Ib1 is opened. This process is repeated until the gate of the interrupt status register Sib of the input module Ib3 is opened and then closed. Then the gate of the data status register Sda of the input module Ia1 is opened. This gate is closed and the gate of the data status register Sda of the input module Ia2 is opened. Then, in this way, the gates of the data status registers Sdb are successively opened and closed one at a time.

During the course of opening the gates of the interrupt status registers Sia, Sib, when a first signal calling for an interrupt is detected in an interrupt status register Sia, Sib, the central processing unit 21 stops opening the gate of the following interrupt status registers Sia, Sib and thereafter opens the gate of the data status register Sda, Sdb in the block 3a or 3b in which the interrupt signal was detected.

Figure 2:
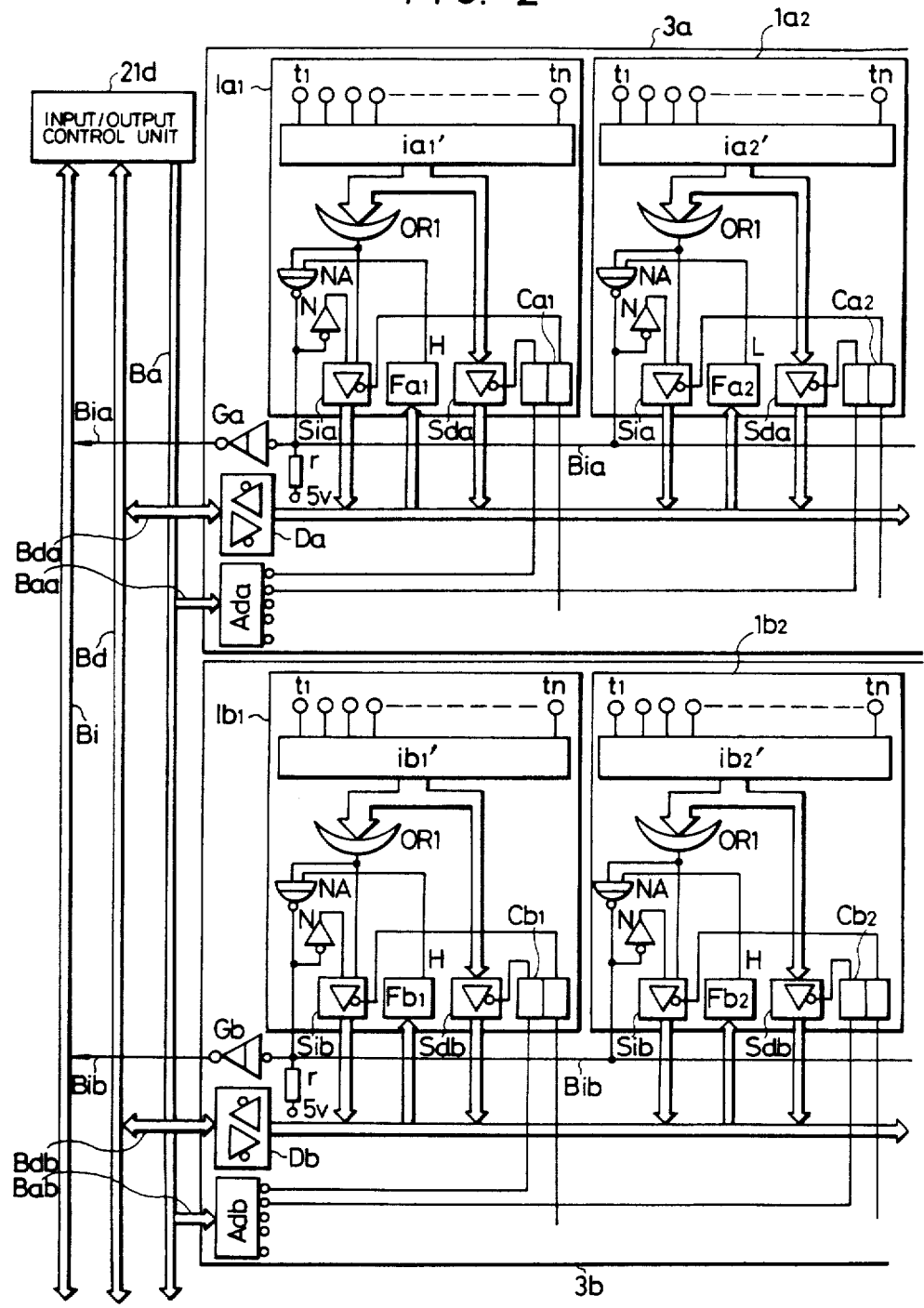
FIG. 2 is a detailed circuitry for the essential portion of the sequence controller of FIG. 1.

FIG. 2 illustrates only two input/output modules Ia1, Ia2, Ib1, Ib2 for each block because of space limitation. But this is enough for explanation of the configuration and operation of this invention.

The outputs of the latch circuits ia1', ia2', ..., ib2' of the input/output modules Ia1 to Ib3 are fed to OR circuits OR1. The outputs of the OR circuits OR1 are supplied to the interrupt status registers Sia, Sib. Also entered to the interrupt status registers Sia, Sib are signals on the interrupt signal lines Bia, Bib which are passed through a NOT circuit N.

The outputs of the OR circuits OR1 are NANDed with the output of the flip-flop Fa1 to Fb3 (only Fa1, Fa2, Fb1, Fb2 are shown) by a NAND circuit NA. The signals produced at the output terminals of the NAND circuits NA are the first signals.

The first signals are connected to the interrupt signal lines Bia, Bib. The interrupt signal lines Bia, Bib are normally applied with 5V through a register r and thus are "high" in terms of binary notation. When a signal calling for an interrupt processing is produced at the NAND circuit NA, the interrupt signal lines go low.

Figure 4:
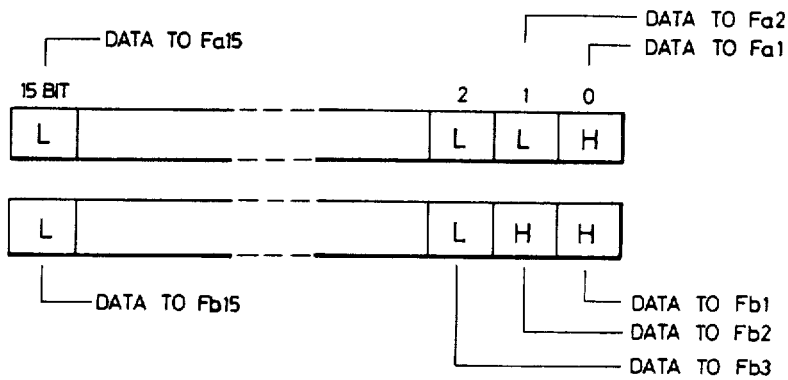
FIG. 4 is a diagram showing the setting status of the flip-flop which make up the specifying means of FIG. 2.

Now, we will explain the specifying means in detail. The flip-flops Fa1 to Fb3 are provided to all input modules. According to the initialize processing performed prior to the start of operation, the data shown in FIG. 4 is sent from the central processing unit 21 through the data bus Bd to these flip-flops whose outputs will then be latched to high level when their associated modules accept the interrupt processing or to low level when they do not. FIG. 4 shows that the input modules Ia1, Ib1, Ib2 can accept the interrupt processing but Ia2, Ib3 cannot.

From the above, it is seen that the NAND circuit NA in the input module Ia2 always has its output at high level and that a signal that enters any of the input terminals t1 to tn in the input module Ia2 is not accepted as an interrupt signal.

When a signal calling for an interrupt processing is output from a module in the block 3a or 3b, the interrupt signal line Bia or Bib for the block to which the module belongs goes to low level. This state is supplied to the basic unit 2 through a one-way gate Ga, Gb and the interrupt signal line Bi. That is, the output of the one-way gate Ga, Gb is the second signal.

When the second signal is output from either block 3a or 3b, the basic unit 2 can know that an interrupt request was made but cannot identify from which module in which block 3a or 3b the request was issued.

Figure 5:
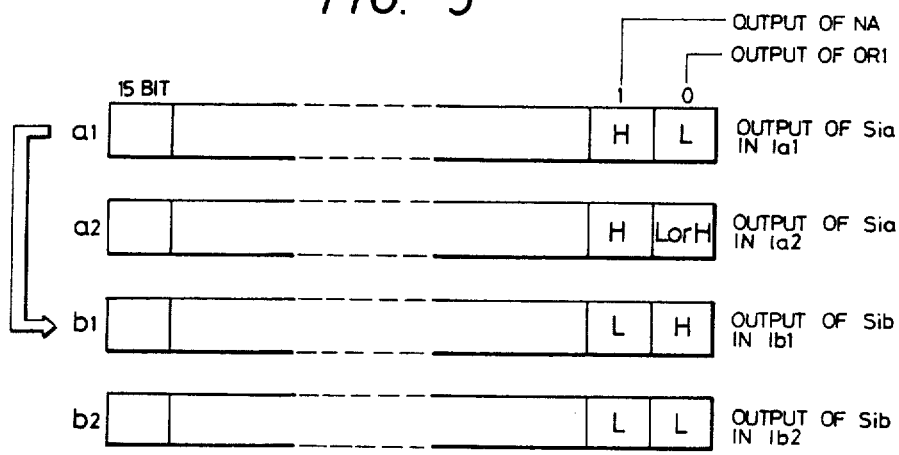
FIG. 5 is a signal state of each bit obtained when the gate of the interrupt status register of FIG. 2 is opened.

Immediately after receiving the second signal, the basic unit 2 stops arithmetic and logic operation which was being carried out according to the sequence program and instead proceeds to opening the gates in the sequence shown in FIG. 3. Suppose a signal calling for an interrupt processing comes to the terminal t1 of the input module Ib1. When the gate of the interrupt status register Sia in the input module Ia1 is opened, the information shown in FIG. 5 at a1 is taken into the basic unit 2 through the data buses Bda and Bd. At this time since the output of the NAND circuit NA in the input module Ia1 and the output of the OR circuit OR1 are both at low level, it can be known that no interrupt request signal is output either from the module Ia1 or any other modules in this block. Thus, the gate of the interrupt status register Sib in the next block, i.e., in the input module Ib1. When this gate is opened, the information obtained is as shown in FIG. 5 at b1 with 0-bit at high level and 1-bit at low level. When the output of the 1-bit in the NAND circuit NA is at low level, it is recognized that an interrupt request is output from this block. When the output of the OR circuit OR1 is at high level, it is known that the interrupt request signal is issued from its module. Thus, the basic unit can recognize that the signal calling for an interrupt processing has been output from the input module Ib1 of the block 3b. After this identification is made, the basic unit 2 now gives a command to the data output switching unit Cb1 through the address bus Adb to open the gate of the data status register Sdb. As a result, the signal from the terminals t1 to tn latched in the module Ib1 is sent through the data buses Bdb, Bd to the basic unit 2 which now can recognize that the interrupt request signal has entered to the input terminal t1 of the module Ib1. Then, the basic unit 2 performs processing according to the above recognition.

In FIG. 5, a2 and b2 represent the signal states obtained when the interrupt status registers Sia, Sib of the modules Ia2, Ib2 are opened. As shown at a2 of FIG. 5, the signal at 0-bit is high or low. Since the output of the flip-flop Fa2 is low even when the 0-bit is high, the terminals t1 to tn of the module Ia2 cannot produce an interrupt request signal.

Figure 6:
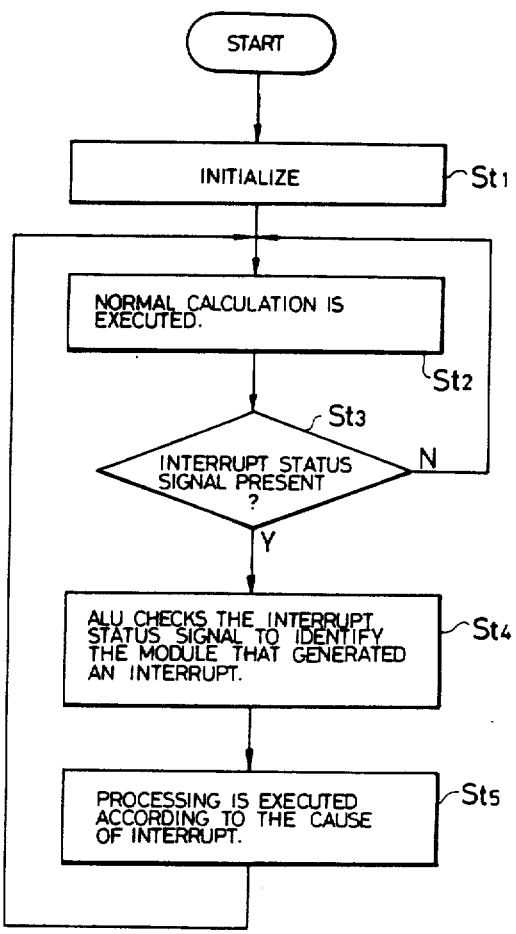
FIG. 6 is a flowchart showing the operation sequence of the controller of this invention.
Figure 7:
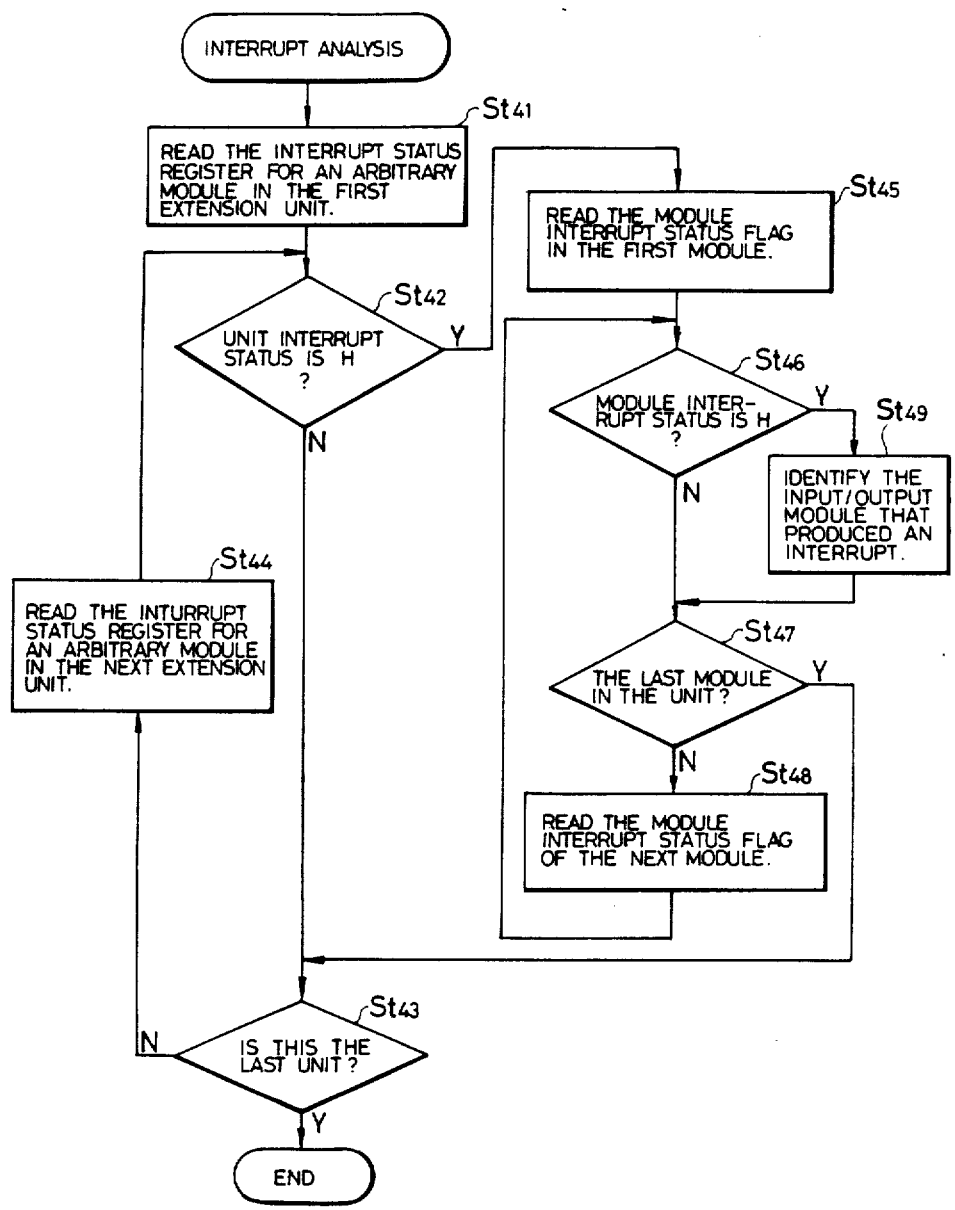
FIG. 7 is a flowchart showing the detailed operation sequence of the step St4 of FIG. 6.

FIGS. 6 and 7 are flowcharts showing the sequence of operations. After the start of operation, the sequence controller is initialized at step St1. At this time, the flip-flops Fa1 to Fb3 explained in FIG. 4 are set.

At St2, processing is performed according to the sequence program. That is, the basic unit 2 takes in the signal input terminal information latched in the specified input module, performs calculation according to the sequence program, and produces the calculation result at the specified output terminal. At this time, the basic unit 2 checks at step St3 on a time-sharing basis whether an interrupt processing request has been entered. If the interrupt processing request is found, the basic unit 2 returns to the step St2. If not, it proceeds to the next step St4. At St4, the unit 2 performs processing as explained in FIG. 5. After this, when the terminal that has produced the interrupt is identified, the basic unit 2 goes to step 5 where it performs necessary processing.

The detailed flow of operation performed at St4 is shown in FIG. 7. The operation at this step will easily be understood from the preceding explanation. When, in the last unit shown at St43, the terminal that produced the interrupt signal cannot be identified, there is a possibility that noise has entered the interrupt signal lines Bi, Bia, Bib. In that case, it is desired that the processing return to the step St2.

Figure 8:
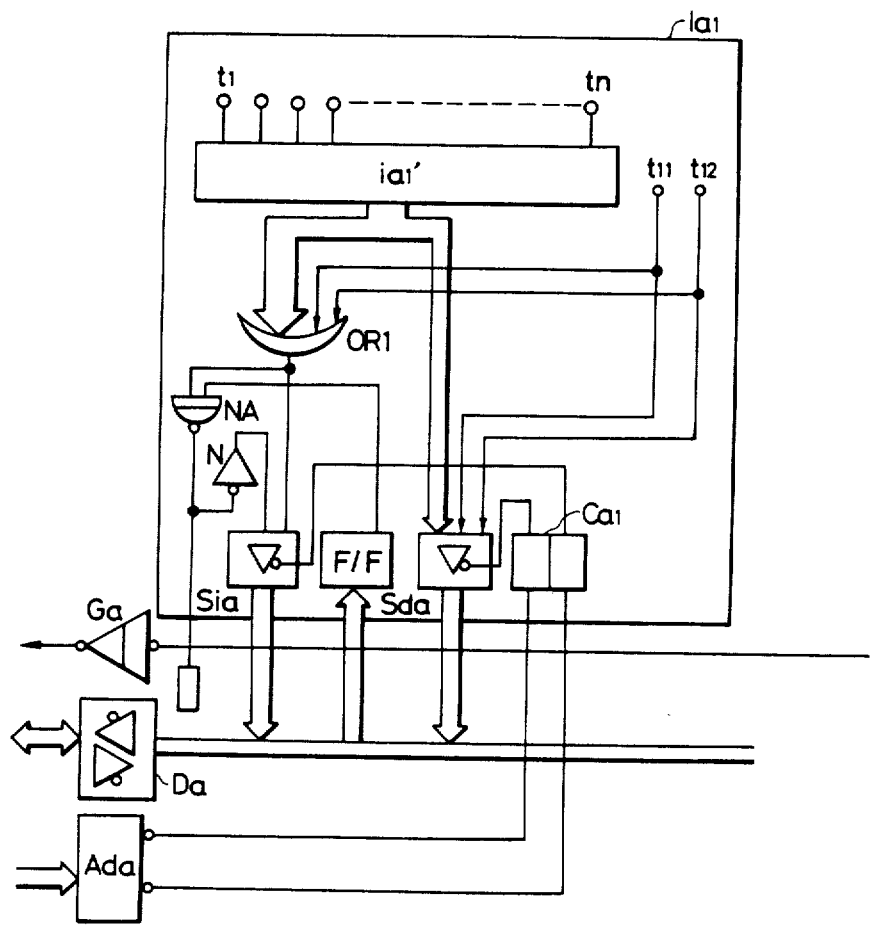
FIG. 8 is a circuitry of another embodiment.

FIG. 8 is another embodiment of this invention. In this embodiment, the interrupt request input terminals include internal terminals t11, t12 in addition to the signal input terminals t1 to tn. When an abnormal condition occurs in a microcomputer (not shown) of, say, the module Ia1, the basic unit 2 outputs the corresponding information to the specified terminals t11 or t12 to signal the occurrence of abnormal condition to external circuits.

Figure 9:
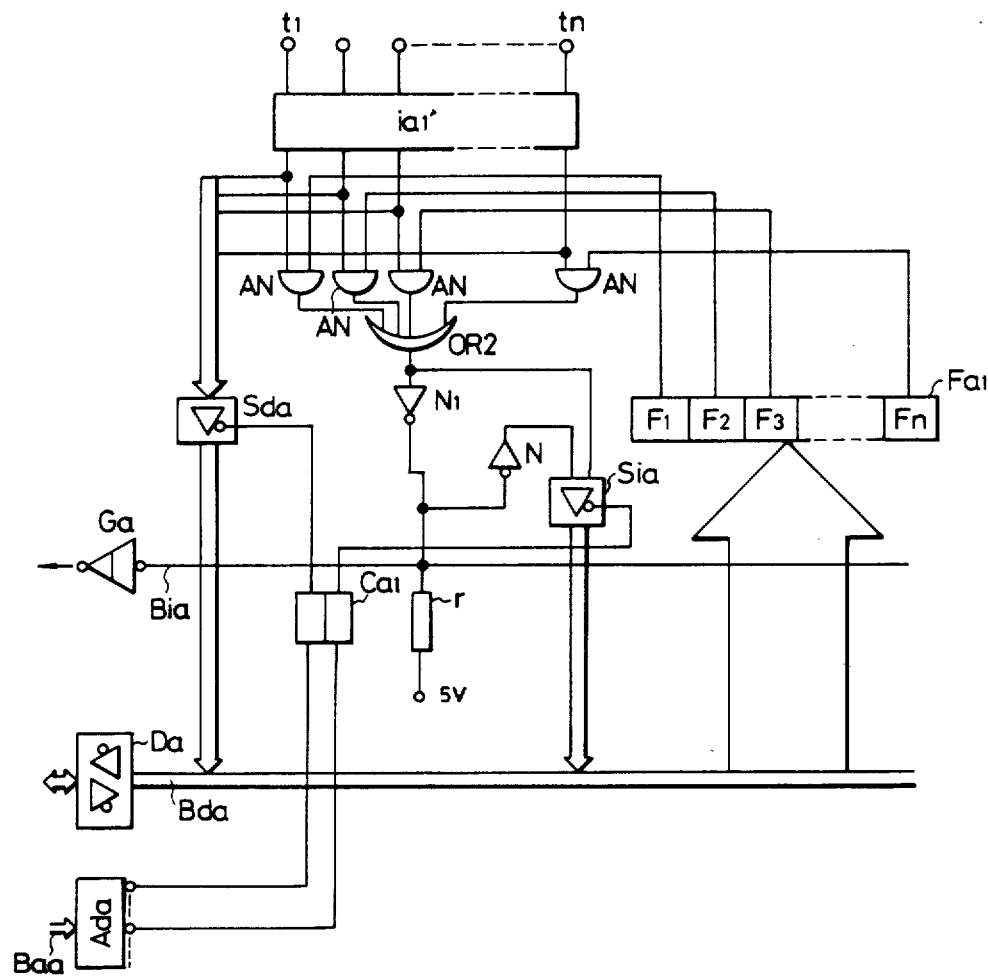
FIG. 9 is a further embodiment.

FIG. 9 is a still another embodiment of the invention. This circuit makes it possible to specify each input terminal of the input module as the one by which an interrupt processing can be requested or as the one by which no interrupt request is made. That is, the flip-flop generally designated by Fa1 has the same number of flip-flop elements F1 to Fn as that of the input terminals t1 to tn. The flip-flop element that corresponds to the terminal that produces an interrupt processing request is set at high level by initialization and the element corresponding to the terminal that does not produce the interrupt request is set to low level. The outputs of the flip-flop elements F1 to Fn are ANDed with the latched signals that entered the input terminals by the AND circuit AN. N1 is a NOT circuit.

We claim:
1. A sequence controller comprising:
a program storage means for storing a sequence program;
external signal input terminals divided into multiple blocks, at least one block being subdivided into multiple groups, each group consisting of multiple terminals;
an arithmetic and logic operation means having a timing signal generating circuit for producing a timing signal, the arithmetic and logic operation means being adapted to perform logic operation on two or more signals including the external signals taken in from the external signal input terminals, according to a sequence program read out from the program storage means in synchronism with the timing signal;
an output means for outputting a control signal according to the result of operation performed by the arithmetic and logic operation means;

first signal generating means for outputting a first signal when a signal calling for an interrupt processing comes to a group of the external signal input terminals;

second signal generating means for outputting a second signal when one of the blocks outputs the first signal;

a second signal transfer means for informing the arithmetic and logic operation means that the second signal has occurred in one of the blocks; and an access means by which the arithmetic and logic operation means when informed by the second signal transfer means of the occurrence of the second signal stops its logic operation required by the sequence program, accesses the second signal generating means successively and, when it finds the block that has produced the second signal, successively accesses the first signal generating means belonging to that block to identify the unit which has outputted the first signal.

2. A sequence controller as set forth in claim 1, wherein the timing signal generating circuit is a program counter which outputs a memory address signal in synchronism with the timing signal and the arithmetic and logic operation means performs logic operations on two or more signals including the external signals taken in from the external signal input terminals, according to the sequence program which was read out from the program storage means according to the memory address signal.

3. A sequence controller as set forth in claim 1, wherein the first signal generating means outputs the first signal when a signal enters a particular one of the external signal input terminals.

4. A sequence controller comprising:

a program storage means for storing a sequence program;

external signal input terminals divided into multiple blocks, at least one block being subdivided into multiple groups, each group consisting of multiple terminals;

an arithmetic and logic operation means having a program counter for outputting a memory address signal in synchronism with a timing signal, the arithmetic and logic operation means being adapted to perform logic operation on two or more signals including the external signals taken in from the external signal input terminals, according to a sequence program which was read out from the program storage means according to the memory address signal;

an output means for outputting a control signal according to the result of operation performed by the arithmetic and logic operation means;

a specifying means for specifying some of the external signal input terminals as an interrupt signal input terminal;

first signal generating means for outputting a first signal when a signal calling for an interrupt processing comes to a particular terminal in a group to which the interrupt signal input terminals belong;

second signal generating means for outputting a second signal when one of the blocks outputs the first signal;

a second signal transfer means for informing the arithmetic and logic operation means that the second signal has occurred in one of the blocks; and an access means by which the arithmetic and logic operation means when informed by the second signal transfer means of the occurrence of the second signal stops its logic operation required by the sequence program, accesses the second signal generating means successively and, when it finds the block that has produced the second signal, successively accesses the first signal generating means belonging to that block to identify the unit which has outputted the first signal.

5. A sequence controller as set forth in claim 4, wherein the specifying means specifies the external signal input terminals as an interrupt signal input terminal one group at a time.

6. A sequence controller as set forth in claim 4, wherein the specifying means specifies the external signal input terminals in the group as an interrupt signal input terminal one terminal at a time.

* * * * *